(12) United States Patent
Pessin et al.

(10) Patent No.: US 7,845,516 B2
(45) Date of Patent: Dec. 7, 2010

(54) SYSTEM FOR PRECISELY CONTROLLING A DISCHARGE RATE OF A PRODUCT FROM A FEEDER BIN

(75) Inventors: Jean-Louis Pessin, Houston, TX (US); Gregoire Jacob, Blois (FR); Josh Rayner, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1004 days.

(21) Appl. No.: 11/277,852

(22) Filed: Mar. 29, 2006

(65) Prior Publication Data
US 2006/0219734 A1    Oct. 5, 2006

Related U.S. Application Data

(60) Provisional application No. 60/667,974, filed on Apr. 4, 2005.

(51) Int. Cl.
G01G 23/01 (2006.01)
B67D 7/08 (2010.01)

(52) U.S. Cl. .................. 222/58; 700/240; 700/305; 702/101; 366/8

(58) Field of Classification Search ............. 366/141, 366/8, 18; 222/55, 56, 52, 58; 702/101; 700/240, 305; 177/1, 25.11
See application file for complete search history.

(56) References Cited

U.S. PATENT DOCUMENTS

| | | | |
|---|---|---|---|
| 4,265,266 A | 5/1981 | Kierbow | |
| 4,353,482 A | 10/1982 | Tomlinson | |
| 4,410,106 A | 10/1983 | Kierbow | |
| 4,427,133 A | 1/1984 | Kierbow | |
| 4,458,827 A * | 7/1984 | Stelte | 222/1 |
| 4,498,783 A * | 2/1985 | Rudolph | 366/132 |
| 4,544,279 A * | 10/1985 | Rudolph | 366/132 |
| RE32,102 E * | 4/1986 | Ricciardi et al. | 177/185 |
| 4,667,503 A * | 5/1987 | Loos | 366/141 |
| 4,893,262 A * | 1/1990 | Kalata | 700/305 |

(Continued)

FOREIGN PATENT DOCUMENTS

RU    2029249    2/1995

(Continued)

OTHER PUBLICATIONS

Zhukowetski, O.V. and Saakiants, A.A.; Means and Systems For Automatic Weighing and Measuring of Loose Materials; URL:http://minproc.ru/thes/2003/section1/the s 2003>, 5 pages.

(Continued)

*Primary Examiner*—Tony G Soohoo
(74) *Attorney, Agent, or Firm*—Michael Dae; David Cate; Robin Nava

(57) ABSTRACT

A system for precisely controlling a discharge rate of a discharged product is provided that includes a feeder bin having an internal chamber; a product disposed in the internal chamber of the feeder bin; and a discharge device that receives a portion of the product and discharges it at a discharge rate from the feeder The system also includes a control system that continually monitors the discharge rate of the discharged product and automatically adjusts the discharge rate based on measurements of the product.

11 Claims, 1 Drawing Sheet

U.S. PATENT DOCUMENTS

| | | | |
|---|---|---|---|
| 4,954,975 A * | 9/1990 | Kalata | 700/305 |
| 5,184,754 A * | 2/1993 | Hansen | 177/50 |
| 5,190,374 A | 3/1993 | Harms et al. | |
| 5,260,880 A * | 11/1993 | Tump | 177/59 |
| 5,382,411 A | 1/1995 | Allen | |
| 5,426,137 A | 6/1995 | Allen | |
| 5,775,532 A * | 7/1998 | Bullivant | 222/1 |
| 2005/0185506 A1 | 8/2005 | Allen | |
| 2006/0219734 A1 * | 10/2006 | Pessin et al. | 222/55 |

FOREIGN PATENT DOCUMENTS

RU      2117147      8/1998

OTHER PUBLICATIONS

Continuously Operating Weigher: URL:http://sweda.com/ua/rus/shop 123 html, 3 pages.

* cited by examiner

SYSTEM FOR PRECISELY CONTROLLING A DISCHARGE RATE OF A PRODUCT FROM A FEEDER BIN

CROSS-REFERENCE TO RELATED APPLICATION

This application claims priority under 35 U.S.C. §119(e) to U.S. Provisional Application Ser. No. 60/667,974, filed on Apr. 4, 2005, which is incorporated herein by reference.

FIELD OF THE INVENTION

The present invention relates generally to a system for precisely controlling the discharge rate of a product from a feeder bin, and more particularly to such a system which continually monitors the discharge rate of the product and automatically adjusts the discharge rate based on measurements of the product.

BACKGROUND

In the oil well drilling and production industry, viscous fluids or gels are often pumped into a well to initiate and propagate underground fractures in order to increase the productivity of the well. Such operations are commonly referred to as well fracturing operations.

The most common method currently used for the continuous on-site preparation of well fracturing gels involves combining a polymeric material with a carrier fluid, such as a hydrocarbon material, in a feeder to form an aqueous solution of the polymeric material. The aqueous solution is then discharged from the feeder and combined with another substance to form a gel. Such a gel preparation method is desirable in that the amount of the aqueous solution that is discharged from the feeder can be precisely controlled, and therefore the resultant gel and its properties can be precisely controlled as well. A drawback of this gel preparation method is that the use of the hydrocarbon carrier fluid, which in many cases is diesel, causes environmental concerns.

Therefore, it is desirable to eliminate the carrier fluid in the feeder, and feed a dry mix of polymeric material from the feeder. However, the flow properties of a dry mix are much less predictable than that of an aqueous solution. This is due to variations in the packing or compactness of the dry mix, the moisture content of the dry mix, and/or the amount of the dry mix in the feeder, among other variations in the environment of the dry mix or other variations in the dry mix itself.

Existing system for discharging a dry mix of a polymeric material from a feeder to form a fracturing gel are described in U.S. Pat. Nos. 5,426,137 and 5,382,411 to Allen; and U.S. Pat. No. 5,190,374 to Harms. These systems include a metering screw or an auger that needs to be calibrated for each dry mix of material that it discharges. However, after the initial calibration of the discharge device, these systems do not include any quality control during the process of discharging the polymer. As such, the actual amount of dry mix that is discharged from the feeder is not measured or controlled.

Instead, the precision and reliability of these systems is dependent solely on the repeatability of the screw/auger to deliver the same amount of dry mix for each turn of the screw/auger. Therefore, using these methods, variations in the flow properties of the dry mix are not taken into consideration. As a result, the properties of the resultant gel that is produced from the dry mix cannot be precisely controlled. Accordingly, a need exists for a method of precisely controlling an amount of a dry mix of material that is discharged from a feeder.

SUMMARY

In one embodiment, the present invention is a system for precisely controlling a discharge rate of a discharged product that includes a feeder bin having an internal chamber; a product disposed in the internal chamber of the feeder bin; and a discharge device that receives a portion of the product and discharges it at a discharge rate from the feeder The system also includes a control system that continually monitors the discharge rate of the discharged product and automatically adjusts the discharge rate based on measurements of the product.

In another embodiment, the present invention is a system for precisely controlling a discharge rate of a discharged product that includes a feeder bin having an internal chamber; a dry mix of material disposed in the internal chamber of the feeder bin; and a discharge device that receives a portion of the dry mix of material and operates at an adjustable speed to discharge the dry mix of material at a discharge rate from the feeder. The system also includes a measurement system that continually makes a measurement indicative of a weight of the discharged dry mix of material; and a control system that receives a feedback signal indicative of the weight of the discharged dry mix of material and automatically adjusts a speed of operation of the discharge device based on the feedback signal in order to precisely control the discharge rate of the discharged dry mix of material.

In yet another embodiment, the present invention is a method of precisely controlling a discharge rate of a discharged product that includes providing a feeder bin having an internal chamber; inserting a dry mix of material into the internal chamber of the feeder bin; and operating a discharge device at an adjustable speed to discharge portions of the dry mix of material at a discharge rate from the feeder. The method also includes making a measurement indicative of a weight of the discharged portions of the dry mix of material; and providing a control system that receives a feedback signal indicative of the weight of the discharged portions of the dry mix of material and automatically adjusts the speed of operation of the discharge device based on the feedback signal in order to precisely control the discharge rate of the discharged portions of the dry mix of material.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION OF EMBODIMENTS OF THE INVENTION

As shown, embodiments of the present invention are directed to a system for precisely controlling a discharge rate of a dry mix of material from a feeder bin. In one embodiment, the dry mix is a polymeric material which is discharged from a feeder bin and combined with a further substance to form a well fracturing gel.

Figure 1:
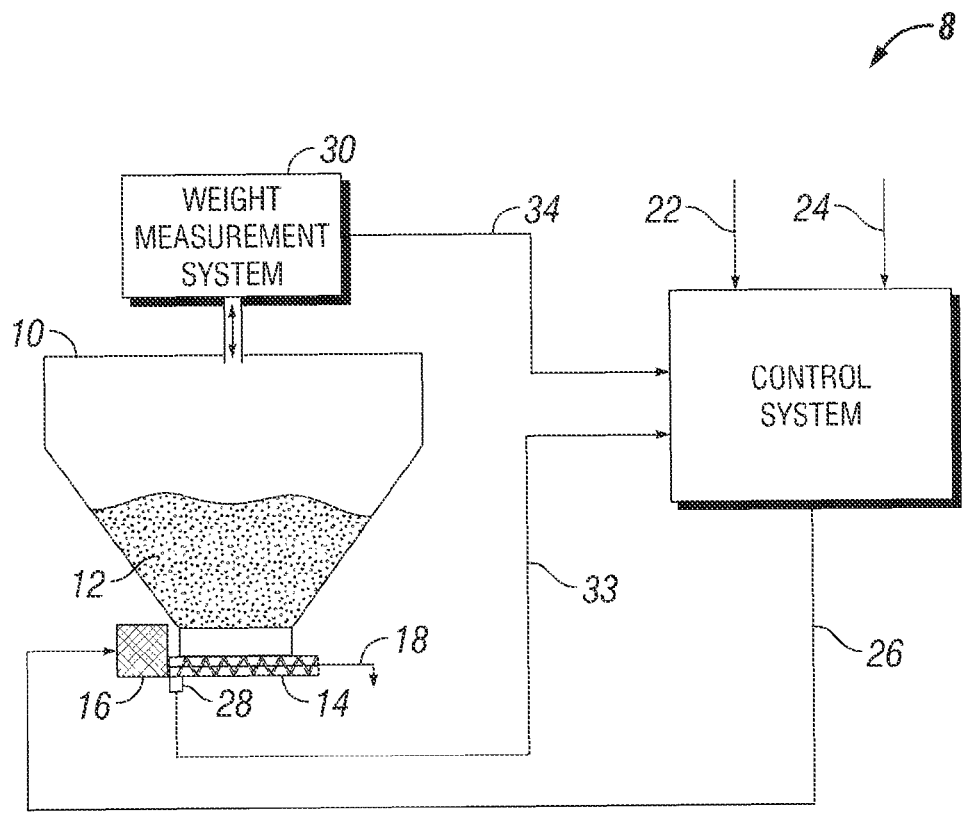
FIG. 1 is a schematic representation of a system for precisely controlling a discharge rate of a dry mix of material from a feeder bin according to one embodiment of the present invention.

FIG. 1 shows a feeder bin 10 having an internal chamber, which receives a dry mix of a product 12. As used herein, the phrase "dry mix" generally refers to a powder, a collection of granules, or another collection of solid materials. Although any appropriate feeder bin may be used in conjunction with the present invention, in the depicted embodiment the feeder bin 10 includes a relatively large upper end, and a generally tapered lower end which funnels the dry mix of product 12 to a discharge device 14. The discharge device 14 may be a metering screw, an auger, or any other appropriate device for receiving a portion of the dry mix of product 12 and discharging it (as represented by arrow 18.) from the feeder bin 10. As shown, the feeder bin 10 also includes a power supply 16 for powering the discharge device 14. The power supply 16 may be any appropriate power supply, such as an electric motor, among other appropriate devices.

In one embodiment, a discharge rate of the dry mix of product 12 is continuously monitored and controlled by a control system 20. Using the control system 20, a high degree of precision in the discharge rate of the dry mix of product 12 can be obtained. An example in which such a high degree of precision is desirable is in the production of a well fracturing gel. In such a production, the dry mix of a product 12 is typically a dry mix of a polymeric material which is discharged from the feeder bin 10 into another substance (typically water) to form a well fracturing gel. The precision of the discharge rate of the dry mix of product 12 allows for a well fracturing gel to be precisely produced with precisely controlled properties. The well fracturing gel may then be pumped into a well to increase its productivity.

FIG. 1 illustrates a system 8 for precisely controlling the discharge rate of the dry mix of product 12 from the feeder bin 10 according to one embodiment of the present invention. As shown, a discharge rate setpoint 22 is input into the control system 20 (for the purpose of this disclosure, the discharge rate setpoint 22 is defined as a desired discharge rate of the dry mix of product 12 in units of weight per unit time.) A calibration curve 24 is also input into the control system 20. The calibration curve 24 is a representation of the speed of operation of the discharge device 14 as a function of the discharge rate of the dry mix of product 12 from the discharge device 14. As such, for any given discharge rate setpoint 22, the calibration curve 24 can be used to provide a speed of operation of the discharge device 14 required to achieve the discharge rate setpoint 22.

As will be recognized by one of skill in the art, the discharge rate setpoint 22 and the calibration curve 24 will vary based on the particular product that is discharged from the feeder bin 10, and the particular use of the discharged product 18. For example, when the discharged product is a dry mix of a polymeric material for use in preparing a well fracturing gel, the discharge rate setpoint 22 will vary based on the desired properties of the resultant gel; and the calibration curve 24 will vary based on the particular product that is discharged from the feeder bin 10. For example, a more dense product has a different calibration curve than a less dense product. Although, the shape of the calibration curve can vary from product to product, in one embodiment the calibration curve is linear.

In one embodiment, during operation of the discharge device 14, the control system 20 continually regulates the speed of operation of the discharge device 14 using feedback information indicative of the actual (measured) speed of operation of the discharge device 14, and the actual (measured) discharge rate of the dry mix of product 12.

To regulate the speed of operation of the discharge device 14, the control system 20 continually calculates a speed setpoint for the discharge device 14 (for the purpose of this disclosure, the speed setpoint of the discharge device 14 is defined as a desired speed of operation of the discharge device 14.) In order to determine the speed setpoint of the discharge device 14, the control system 20 uses the calibration curve 24 to calculate a theoretical speed of operation of the discharge device 14 required to obtain the inputted discharge rate setpoint 22.

During operation of the discharge device 14, variations in the environment of the dry mix 12 or variations in the dry mix 12 itself may cause the actual discharge rate of the dry mix of product 12 to vary from the discharge rate setpoint 22. As such, the control system 20 continually calculates the actual discharge rate of the dry mix of product 12 in order to determine a correction factor, defined as a ratio of the discharge rate setpoint and the actual discharge rate.

The theoretical speed of operation of the discharge device 14 is continually corrected by the correction factor to give the speed setpoint for the discharge device 14 (that is, the speed setpoint is equal to the theoretical speed multiplied by the correction factor.) The control system 20 continuously sends command signals 26 indicative of the speed setpoint to the power supply 16 of the discharge device 14.

Figure 2:
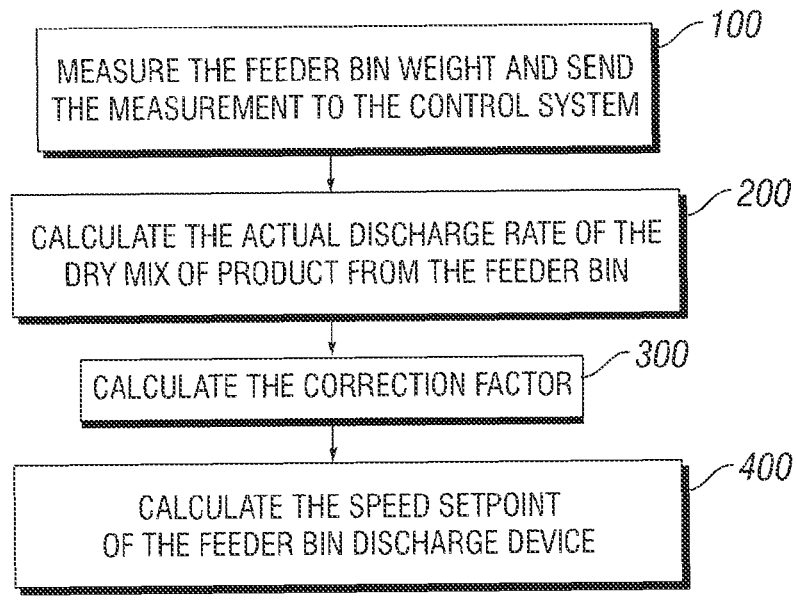
FIG. 2 illustrates a method of determining an actual discharge rate of the dry mix of material using the system of FIG. 1.

FIGS. 1 and 2 taken together, illustrate a system and method of determining the actual discharge rate of the dry mix of product 12, which is then used to calculate the correction factor. As shown, at step 100 a weight measurement system 30, such as a collection of one or more load cells, continually measures the weight of the feeder bin 10, 10 and sends a feedback signal 34 indicative thereof to the control system 20. At step 200 the control system 20 calculates the change in weight of the feeder bin 10 for a given time sample, in order to obtain an actual discharge rate of the dry mix of product 12 from the feeder bin 10.

Based on the actual discharge rate calculation, at step 300 the control system 20 further calculates the correction factor, equal to the discharge rate setpoint 22 divided by the actual discharge rate. At step 400 the theoretical speed of operation of the discharge device 14 is continually corrected by the correction factor to give the speed setpoint for the discharge device 14, as described above. As is also described above, the control system 20 continuously sends command signals 26 indicative of the speed setpoint to the power supply 16 of the discharge device 14.

The above steps, however, do not take into account discrepancies between the actual speed of operation of the discharge device 14 and the speed setpoint calculated by the control system 20. As such, in addition to monitoring the actual discharge rate of the dry mix of product 12, the control system 20 simultaneously monitors the actual speed of the discharge device 14 and corrects the command signal 26 when a difference exists between the actual speed of operation and the speed setpoint.

For example, in one embodiment a measurement device 28, such as an encoder, measures the actual speed of operation of the discharge device 14; and a signal 33 indicative of the actual speed of operation of the discharge device 14 is continuously fed to the control system 20. The control system 20 then compares the actual (measured) speed 33 of the discharge device 14 with the speed setpoint; and continually adjusts the speed command signal 26 based on any differences therebetween.

Although the above description focuses on the discharge of a dry mix of a polymeric material from a feeder, the present invention can be used for the delivery of any dry product or solid through a discharge feeder for which a precise and reliable delivery is required.

The preceding description has been presented with reference to presently preferred embodiments of the invention. Persons skilled in the art and technology to which this invention pertains will appreciate that alterations and changes in the described structures and methods of operation can be practiced without meaningfully departing from the principle, and scope of this invention. Accordingly, the foregoing description should not be read as pertaining only to the precise structures described and shown in the accompanying drawings, but rather should be read as consistent with and as support for the following claims, which are to have their fullest and fairest scope.

What is claimed is:

1. A system for precisely controlling a discharge rate of a discharged product comprising:
   a feeder bin having an internal chamber;
   a dry mix of material disposed in the internal chamber of the feeder bin;
   a discharge device that receives a portion of the dry mix of material and operates at an adjustable speed to discharge said portion of the dry mix of material from the feeder;
   a measurement system that continually makes a measurement indicative of a weight of the feeder bin; and
   a control system that receives an input discharge rate setpoint, an input of a calibration curve comprising a representation of a speed of operation of the discharge device as a function of a discharge rate of the dry mix of material, and a feedback signal indicative of the weight of the feeder bin,
   wherein the control system calculates a theoretical speed of operation based on the input discharge rate setpoint and the calibration curve, determines an actual discharge rate based on the measurement indicative of the weight of the feeder bin, calculates a correction factor that is equal to the input charge rate setpoint divided by the actual discharge rate, calculates a speed setpoint that is equal to the theoretical speed of operation multiplied by the correction factor, and automatically adjusts the adjustable speed of the discharge device based on the calculated speed setpoint in order to precisely control the discharge rate of the discharged dry mix of material.

2. The system of claim 1, wherein a measurement device measures an actual speed of operation of the discharge device, and wherein the control system adjusts the speed of operation of the discharge device, and wherein the control system adjusts the speed of operation of the discharge device based on both the weight of the discharged dry mix of material and the measured speed of operation of the discharge device.

3. The system of claim 2, wherein the dry mix of material is a dry mix of a polymeric material.

4. The system of claim 1, wherein the control system continually receives the feedback signal indicative of the weight of the discharged portions of the dry mix of material and further continually adjusts the speed of operation of the discharge device based on the feedback signal.

5. A method of precisely controlling a discharge rate of a discharged product comprising:
   providing a feeder bin having an internal chamber;
   inserting a dry mix of material into the internal chamber of the feeder bin;
   operating a discharge device at an adjustable speed to discharge portions of the dry mix of material from the feeder;
   making a measurement indicative of a weight of the dry mix of material in the feeder bin;
   providing a control system that receives an input discharge rate setpoint, an input of a calibration curve comprising a representation of a speed of operation of the discharge device as a function of a discharge rate of the dry mix of material, and a feedback signal indicative of the weight of the feeder bin;
   calculating a theoretical speed of operation based on the input discharge rate setpoint and the calibration curve;
   determining an actual discharge rate based on the measurement indicative of the weight of the feeder bin;
   calculating a correction factor that is equal to the input charge rate setpoint divided by the actual discharge rate;
   calculating a speed setpoint that is equal to the theoretical speed of operation multiplied by the correction factor; and
   automatically adjusting the adjustable speed of the discharge device based on the calculated speed setpoint in order to precisely control the discharge rate of the discharged dry mix of material.

6. The method of claim 5, further comprising measuring an actual speed of operation of the discharge device, and wherein the control system further adjusts the speed of operation of the discharge device based on a difference in the actual speed of operation of the discharge device and a desired speed of operation of the discharge device.

7. The method of claim 6, wherein the dry mix of material is a dry mix of a polymeric material.

8. The method of claim 7, further comprising combining the discharged portions of the dry mix of material with a further substance to form a well fracturing gel.

9. The method of claim 5, further comprising continually making a measurement indicative of a weight of the dry mix of material in the feeder bin, and wherein the control system continually receives the feedback signal indicative of the weight of the discharged portions of the dry mix of material and further continually adjusts the speed of operation of the discharge device based on the feedback signal.

10. The method of claim 5, further comprising continuously calculating the correction factor.

11. The method of claim 5, wherein the dry mix of material is a dry mix of a polymeric material, the method further comprising combining the discharged portions of the dry mix of material with a further substance to form a well fracturing gel, and calculating the correction factor during the combining.

* * * * *